United States Patent [19]
Parkinson et al.

[11] Patent Number: 5,555,429
[45] Date of Patent: Sep. 10, 1996

[54] MULTIPORT RAM BASED MULTIPROCESSOR

[75] Inventors: Ward D. Parkinson; William K. Waller; Mirmajid Seyyedy, all of Boise, Id.

[73] Assignee: Micron Technology, Inc., Boise, Id.

[21] Appl. No.: 437,447

[22] Filed: May 8, 1995

Related U.S. Application Data

[63] Continuation of Ser. No. 842,791, Feb. 27, 1992, Pat. No. 5,475,631, which is a continuation of Ser. No. 321,184, Mar. 9, 1989, abandoned.

[51] Int. Cl.$^6$ .................................................. G06F 15/16
[52] U.S. Cl. ...................................... 395/800; 364/DIG. 1
[58] Field of Search ................................................ 395/800

[56] References Cited

U.S. PATENT DOCUMENTS

| | | |
|---|---|---|
| 3,767,906 | 10/1973 | Pryor . |
| 4,065,666 | 12/1977 | Wu . |
| 4,142,242 | 2/1979 | Duvochel et al. . |
| 4,215,401 | 7/1980 | Holsztynski et al. ............... 382/304 |
| 4,228,518 | 10/1995 | Chamberlin . |
| 4,257,095 | 3/1981 | Nadir . |
| 4,270,167 | 5/1981 | Koelher et al. . |
| 4,338,675 | 7/1982 | Palmer et al. . |
| 4,349,888 | 9/1982 | Smith . |
| 4,417,314 | 11/1983 | Best . |
| 4,484,259 | 11/1984 | Palmer et al. . |
| 4,541,067 | 9/1985 | Whitaker . |
| 4,567,385 | 1/1986 | Falater et al. . |
| 4,580,215 | 4/1986 | Morton . |
| 4,620,117 | 10/1986 | Fang . |
| 4,622,648 | 11/1986 | Whitaker . |
| 4,723,223 | 2/1988 | Mcdonough et al. . |
| 4,724,517 | 2/1988 | May . |
| 4,752,901 | 6/1988 | Vaughn . |
| 4,797,808 | 1/1989 | Bellay et al. . |
| 4,839,539 | 6/1989 | Takata et al. . |
| 4,851,834 | 7/1989 | Stockebrand et al. . |
| 4,878,191 | 10/1989 | Oguchi . |
| 4,893,031 | 1/1990 | Masuda . |
| 4,912,636 | 3/1990 | Magar et al. . |
| 4,933,577 | 6/1990 | Wong et al. . |
| 5,003,508 | 3/1991 | Hall .......................................... 395/286 |
| 5,034,887 | 7/1991 | Yasui et al. . |
| 5,053,949 | 10/1991 | Allison et al. . |

OTHER PUBLICATIONS

Gupta et al., "A VLSI Architecture for Updating Raster--Scan Displays", *Computer Graphics*, vol. 15, No. 3, Aug. 1981, pp. 71–78.
Steven G. Morton, "Intelligent Memory Chips Provide Ultra High Performance Digital Signal Processing and Pattern Recognition," Oxford Computer, May, 20, 1988.
Colin Johnson, "Smart" RAM Pulls Vector Duty, Electronic Engineering Times, Apr. 25, 1988, Issue 483, pp. 45 and 48.
Steven Morton, "Intellegent Memory Chips Break the Von Neumann bjottleneck," Synapse Connection, Apr. 1988, pp. 1, 10–14.

*Primary Examiner*—William M. Treat
*Attorney, Agent, or Firm*—Susan B. Collier

[57] ABSTRACT

Presented is an integrated circuit chip including a random access memory (RAM) array, serial access memory (SAM), an arithmetic logic unit, a bidirectional shift register, and masking circuitry. The arithmetic logic unit, SAM, shift register, and masking circuitry are all as wide as one side of the RAM array, and are all communicable with each other via data transfer means. This allows wide word processing, user configurable for parallel processing. Bits masked by the masking circuitry are selectable by data in the bidirectional shift register, providing shiftable masking means. Random access and serial access are done through separate ports. The bidirectional shift register is optionally serially accessible. Methods of use are also presented.

11 Claims, 15 Drawing Sheets

| ACTION | RESULT | | | | | | | | | RESULT IN |
|---|---|---|---|---|---|---|---|---|---|---|
| | C | M S B | | L S B | | C | M S B | | L S B | |
| INITIALIZE | | | | | | | | | | |
| LOAD DATA | X | 1 | 0 | 1 | 0 | X | 1 | 1 | 0 | RAM1 |
| LOAD MASK | 0 | 1 | 1 | 1 | 1 | 0 | 1 | 1 | 1 | SAM |
| | | | | | | | | | | |
| SELECTIVE CLEAR | | | | | | | | | | |
| RAM1 AND SAM | 0 | 1 | 0 | 1 | 0 | 0 | 1 | 1 | 0 | LATCH (ANSWER) |

FIG.3

| ACTION | RESULT | | | | | | | | | RESULT IN |
|---|---|---|---|---|---|---|---|---|---|---|
| | C | M S B | | L S B | | C | M S B | | L S B | |
| INITIALIZE | | | | | | | | | | |
| LOAD SET 1 | X | 1 | 0 | 1 | 0 | X | 1 | 1 | 1 0 | RAM1 |
| LOAD SET 2 | X | 0 | 1 | 1 | 0 | X | 1 | 1 | 0 1 | RAM2 |
| LOAD MASK | 0 | 1 | 1 | 1 | 1 | 0 | 1 | 1 | 1 1 | SAM |
| RAM1 AND SAM | 0 | 1 | 0 | 1 | 0 | 0 | 1 | 1 | 1 0 | LATCH |
| LATCH TO RAM1 | 0 | 1 | 0 | 1 | 0 | 0 | 1 | 1 | 1 0 | RAM1 |
| RAM2 AND SAM | 0 | 0 | 1 | 1 | 0 | 0 | 1 | 1 | 0 1 | LATCH |
| LATCH TO RAM2 | 0 | 0 | 1 | 1 | 0 | 0 | 1 | 1 | 0 1 | RAM2 |
| RAM1 TO SAM | 0 | 1 | 0 | 1 | 0 | 0 | 1 | 1 | 1 0 | SAM |
| FIRST ADD CYCLE | | | | | | | | | | |
| RAM2 XOR SAM | 0 | 1 | 1 | 0 | 0 | 0 | 0 | 0 | 1 1 | LATCH |
| LATCH TO RAM3 | 0 | 1 | 1 | 0 | 0 | 0 | 0 | 0 | 1 1 | RAM3 |
| RAM2 AND SAM | 0 | 0 | 0 | 1 | 0 | 0 | 1 | 1 | 0 0 | LATCH |
| SHIFT LATCH | 0 | 0 | 1 | 0 | 0 | 1 | 1 | 0 | 0 0 | LATCH |
| LATCH TO SAM | 0 | 0 | 1 | 0 | 0 | 1 | 1 | 0 | 0 0 | SAM |
| SECOND ADD CYCLE | | | | | | | | | | |
| RAM3 XOR SAM | 0 | 1 | 0 | 0 | 0 | 1 | 1 | 0 | 1 1 | LATCH |
| LATCH TO RAM2 | 0 | 1 | 0 | 0 | 0 | 1 | 1 | 0 | 1 1 | RAM2 |
| RAM3 AND SAM | 0 | 0 | 1 | 0 | 0 | 0 | 0 | 0 | 0 0 | LATCH |
| SHIFT LATCH | 0 | 1 | 0 | 0 | 0 | 0 | 0 | 0 | 0 0 | LATCH |
| LATCH TO SAM | 0 | 1 | 0 | 0 | 0 | 0 | 0 | 0 | 0 0 | SAM |
| THIRD ADD CYCLE | | | | | | | | | | |
| RAM2 XOR SAM | 0 | 0 | 0 | 0 | 0 | 1 | 1 | 0 | 1 1 | LATCH |
| LATCH TO RAM3 | 0 | 0 | 0 | 0 | 0 | 1 | 1 | 0 | 1 1 | RAM3 |
| RAM2 AND SAM | 0 | 1 | 0 | 0 | 0 | 0 | 0 | 0 | 0 0 | LATCH |
| SHIFT LATCH | 1 | 0 | 0 | 0 | 0 | 0 | 0 | 0 | 0 0 | LATCH |
| LATCH TO SAM | 1 | 0 | 0 | 0 | 0 | 0 | 0 | 0 | 0 0 | SAM |
| FOURTH ADD CYCLE | | | | | | | | | | |
| RAM3 XOR SAM | 1 | 0 | 0 | 0 | 0 | 1 | 1 | 0 | 1 1 | LATCH |
| LATCH TO RAM2 | 1 | 0 | 0 | 0 | 0 | 1 | 1 | 0 | 1 1 | RAM2 (ANSWER) |

FIG.6

| ACTION | RESULT | | | | | | | | | | RESULT IN |
|---|---|---|---|---|---|---|---|---|---|---|---|
| | C | M S B | | | L S B | C | M S B | | | L S B | |
| INITIALIZE | --- | --- | --- | --- | --- | --- | --- | --- | --- | --- | |
| LOAD SET 1 | X | 1 | 0 | 1 | 0 | X | 1 | 1 | 1 | 0 | RAM1 |
| LOAD SET 2 | X | 0 | 1 | 1 | 0 | X | 1 | 1 | 0 | 1 | RAM2 |
| LOAD MASK | 0 | 1 | 1 | 1 | 1 | 0 | 1 | 1 | 1 | 1 | SAM |
| RAM1 AND SAM | 0 | 1 | 0 | 1 | 0 | 0 | 1 | 1 | 1 | 0 | LATCH |
| LATCH TO RAM1 | 0 | 1 | 0 | 1 | 0 | 0 | 1 | 1 | 1 | 0 | RAM1 |
| RAM2 AND SAM | 0 | 0 | 1 | 1 | 0 | 0 | 1 | 1 | 0 | 1 | LATCH |
| LATCH TO RAM2 | 0 | 0 | 1 | 1 | 0 | 0 | 1 | 1 | 0 | 1 | RAM2 |
| RAM1 TO SAM | 0 | 1 | 0 | 1 | 0 | 0 | 1 | 1 | 1 | 0 | SAM |
| ADD RAM1 AND RAM2 | --- | --- | --- | --- | --- | --- | --- | --- | --- | --- | |
| RAM2 PLUS SAM | 1 | 0 | 0 | 0 | 0 | 1 | 1 | 0 | 1 | 1 | LATCH |
| LATCH TO RAM2 | 1 | 0 | 0 | 0 | 0 | 1 | 1 | 0 | 1 | 1 | RAM2 (ANSWER) |

FIG. 7

```
       ZZZZ
       0000
       3210

0100       Y nibble
     X 1010       Z nibble
     ------
       0000       1st subZ cycle
      0100        2nd subZ cycle
     0000         3rd subZ cycle
   + 0100         4th subZ cycle
   ---------
     0101000      ANSWER
```

FIG.10A

```
ACTION              S                    R
-----------------------------------------------------
                  M       L       M       L
                  S       S       S       S
                  B       B       B       B
INITIALIZE    ---------------------------------------
R = 0                                 0 0000 0000
S = Y         0 0000 0100

1ST SUBZ CYCLE ----------------------------------------
Z00 = 0, SO
SHIFT S LEFT  0 0000 1000

2ND SUBZ CYCLE ----------------------------------------
Z01 = 1, SO
R = S + R                             0 0000 1000
SHIFT S LEFT  0 0001 0000

3RD SUBZ CYCLE ----------------------------------------
Z02 = 0, SO
SHIFT S LEFT  0 0010 0000

4TH SUBZ CYCLE ----------------------------------------
Z03 = 1, SO
R = S + R                             0 0010 1000
SHIFT S LEFT  0 0100 0000

ANSWER --------------------------------------------------
                                      0 0010 1000
```

FIG.10B

MATRIX EQUATION: YZ=X

GENERAL EQUATION: $\begin{bmatrix} A1 & B1 \\ A2 & B2 \end{bmatrix} \begin{bmatrix} Z1 \\ Z2 \end{bmatrix} = \begin{bmatrix} (A1Z1+B1Z2) \\ (A2Z1+B2Z2) \end{bmatrix} = \begin{bmatrix} X1 \\ X2 \end{bmatrix}$ BINARY EXAMPLE: $\begin{bmatrix} 0100 & 1111 \\ 0011 & 0001 \end{bmatrix} \begin{bmatrix} 1010 \\ 1111 \end{bmatrix} = \begin{bmatrix} 100001001 \\ 000101101 \end{bmatrix}$

```
ACTION                  RESULT                              RESULT IN
-------------------------------------------------------------------------
                              M L                M L
                              S S                S S
                        D DDDD B B        D DDDD B B
INITIALIZE --------------------------------------------------------------
COL. A TO RAM1          0 0000 0011       0 0000 0100       RAM1
COL. B TO RAM2          0 0000 0001       0 0000 1111       RAM2
ZEROS TO RAM3           0 0000 0000       0 0000 0000       RAM3

1ST Z CYCLE -------------------------------------------------------------
RAM1 TO BSR             0 0000 0011       0 0000 0100       BSR
Z10 = 0, SO
SHIFT BSR LEFT          0 0000 0110       0 0000 1000       BSR
Z11 = 1, SO
RAM3 PLUS BSR           0 0000 0110       0 0000 1000       SAM
SAM TO RAM3             0 0000 0110       0 0000 1000       RAM3
SHIFT BSR LEFT          0 0000 1100       0 0001 0000       BSR
Z12 = 0, SO
SHIFT BSR LEFT          0 0001 1000       0 0010 0000       BSR
Z13 = 1, SO
RAM3 PLUS BSR           0 0001 1110       0 0010 1000       SAM
SAM TO RAM3             0 0001 1110       0 0010 1000       RAM3

2ND Z CYCLE -------------------------------------------------------------
RAM2 TO BSR             0 0000 0001       0 0000 1111       BSR
Z20 = 1, SO
RAM3 PLUS BSR           0 0001 1111       0 0011 0111       SAM
SAM TO RAM3             0 0001 1111       0 0011 0111       RAM3
SHIFT BSR LEFT          0 0000 0010       0 0001 1110       BSR
Z21 = 1, SO
RAM3 PLUS BSR           0 0010 0001       0 0101 0101       SAM
SAM TO RAM3             0 0010 0001       0 0101 0101       RAM3
SHIFT BSR LEFT          0 0000 0100       0 0011 1100       BSR
Z22 = 1, SO
RAM3 PLUS BSR           0 0010 0101       0 1001 0001       SAM
SAM TO RAM3             0 0010 0101       0 1001 0001       RAM3
SHIFT BSR LEFT          0 0000 1000       0 0111 1000       BSR
Z23 = 1, SO
RAM3 PLUS BSR           0 0010 1101       1 0000 1001       SAM
SAM TO RAM3             0 0010 1101       1 0000 1001       RAM3

ANSWER ------------------------------------------------------------------
                        0 0010 1101       1 0000 1001       RAM3
```

FIG. 11

| ACTION | RESULT | | | | | | | | | | RESULT IN |
|---|---|---|---|---|---|---|---|---|---|---|---|
| INITIALIZE | | | | | | | | | | | |
| LOAD DATA | A | A | A | A | A | A | A | A | A | A | RAM1 |
| LOAD DATA | B | B | B | B | B | B | B | B | B | B | SAM |
| LOAD MASK | 1 | 1 | 0 | 0 | 0 | 1 | 1 | 0 | 0 | 1 | BSR |
| PERFORM MASK | | | | | | | | | | | |
| RAM1 TO SAM | A | A | B | B | B | A | A | B | B | A | SAM (ANSWER) |

FIG.13

MULTIPORT RAM BASED MULTIPROCESSOR

This is a continuation of application Ser. No. 07/842,791, filed Feb. 27, 1992, now U.S. Pat. No. 5,475,631, which is a continuation of application Ser. No. 07/321,184, filed Mar. 9, 1989, now abandoned.

FIELD OF THE INVENTION

This invention generally applies to parallel and video digital processing, specifically to multiport random access memory based multiprocessing.

PRIOR ART

Two trends in computer technology are evident today: increasing desire for high volume data processing ability (massive number crunching ability), and increasing desire for fast data access ability. These two trends go hand in hand. Massive number crunching ability is not efficient if the device spends most of its time waiting for input data. On the other hand, fast data access ability does not have much significance when used with a relatively slow processor.

Some have turned to parallel processing techniques for answers to the number crunching problem, the theory being that if a uniprocessor (one processor) performs an operation fast, a multiprocessor (more than one processor working in parallel) performs the operation much faster.

Others, for video processing, have developed fast data access techniques. Video applications require large amounts of data from memory in very short times to refresh video screens, which means fast data access is required. Standard dynamic random access memory (dynamic RAM) is not fast enough to do this because data in RAM is accessed on a per address basis. When data is read from or written to RAM (either operation being called "access"), an address corresponding to the data must be indicated to the RAM, which lengthens access time. This time is extended further because dynamic RAM addressing is multiplexed, and internally utilizes a destructive read, which means each read cycle must be long enough to allow the memory to restore any cells that have been read.

Some techniques have been developed to reduce this data access bottleneck. One is the combination of RAM and SAM (serial access memory, such as a shift register or equivalent), wherein a block of data (such as a row of memory) is wholly transferable between SAM and RAM. A data block can be wholly transferred from RAM to SAM, and then serially read from SAM, the serial read being fast. Conversely, a data block can be serially written into SAM (a fast data write), then wholly transferred into RAM. This approach requires addressing of only a data block, then serially accessing the information within the block. SAM access is also faster because a SAM read is not destructive, so no time must be taken to restore read bits.

An interesting parallel processing prior art technique, the "intelligent memory" chip set, which performs matrix multiplication, has been developed by Steven G. Morton of Oxford Computers in Oxford, Conn. This invention is described in articles "Intelligent Memory Chips Provide Ultra High Performance Digital Signal Processing and Pattern Recognition", S. Morton, May 20, 1988, submitted to Electronic Imaging 1988 Conference; ""Smart" RAM Pulls Vector Duty", R. Colin Johnson, *Electronic Engineering Times*, Apr. 25, 1988, p. 1; "Intelligent Memory Chips Break the Von Neumann Bottleneck", S. Morton, *Synapse Connection*, April 1988, p. 1; "Matrix Crunching with Massive Parallelism", Bob Cushman, *VLSI Systems Design*, December 1988. Morton's design includes special purpose memory chips which are controlled to produce partial products, the partial products then being sent to an accumulator chip for final adding.

Video processing prior art includes a multiport DRAM, made by Digital Equipment Corporation (DEC), of Maynard, Mass. The multiport DRAM has RAM and at least one shift register on a common substrate, each having a port for accessibility. Also made is a video RAM (VRAM), by Texas Instruments Incorporated of Dallas Tex., which is a dual port DRAM.

A single chip multiprocessor would be advantageous. Of further advantage would be a multiprocessor with multiport RAM fast data accessibility. Hence the conception of a wide processor included within a multiport RAM, also called a multiport RAM based multiprocessor. Such a processor would include both fast access and multiprocessing in a single, easy to use chip.

SUMMARY OF THE INVENTION

Several embodiments of the invention are disclosed herein. A first embodiment of the invention is disclosed which includes a multiport RAM which includes an ALU and a latch. The ALU uses an entire RAM row and an entire SAM register as inputs, outputting to the latch. Rows of data are transferable between RAM, SAM, and the latch. RAM and SAM access is consistent with prior art multiport RAM operation. Five more embodiments of increasing complexity are also disclosed, the final and sixth embodiment being preferred, which includes a bidirectional shift register (BSR) which inputs to the ALU, masking means controllable by the BSR, and two SAM registers, one of which obtains the ALU output.

One advantage is that blocks (such as rows) of data can be processed simultaneously. If the blocks are segmented into data words, the effect is that those words are processed in parallel. The disclosed embodiments each contain 1 megabit of RAM and each process 2048 bits in parallel, which can be segmented into any desired smaller word width.

Another advantage is that the invention is containable within a single chip, reducing cost and enhancing ease of implementation.

Another advantage is that chips embodying the invention can be cascaded for higher parallelism. For example, if one chip processes 2048 bits in parallel, two cascaded chips process 4096 bits in parallel.

Another advantage is that each element within the preferred embodiment can be made separately accessible. For example, the multiport RAM based multiprocessor can be used as a RAM device, shift register, processor, or a combination of the three.

Another advantage is that an embodiment of the invention can perform parallel binary operations on blocks of data, as well as perform matrix multiplication.

The preferred embodiment of the invention includes circuitry for a shiftable mask, which is useful for moving windows superimposed on a video field.

BRIEF DESCRIPTION OF THE DRAWINGS

FIG. 3 contains a table showing a selective clear operation in the first embodiment. "X" in the table indicates a "don't care" bit.

FIG. 6 contains a table showing an addition operation by the second embodiment. "X" in the table indicates a "don't care" bit.

FIG. 7 contains a table showing an addition operation by the third embodiment.

FIGS. 10a and 10b show a novel multiplication algorithm by way of example.

FIG. 11 contains a table showing a matrix multiplication operation by the fourth embodiment.

FIG. 13 contains a table showing a mask operation.

DETAILED DESCRIPTION OF THE PREFERRED EMBODIMENT

Six embodiments are now disclosed, in order of increasing complexity. The first embodiment performs simple parallel logic operations. The second embodiment can be cycled to perform simple parallel addition, as well as other operations. The third embodiment includes a ripple carry adder and therefore performs single cycle parallel addition. The fourth embodiment includes a ripple carry adder and a bidirectional shift register (BSR), and is configured so that matrix multiplication is easily performed. The fifth embodiment includes all of the fourth, and also includes mask circuitry on the BSR outputs, making shiftable mask operations possible. The sixth embodiment includes all of the fifth, and also includes another SAM register and an optional port on the BSR.

Figure 1:
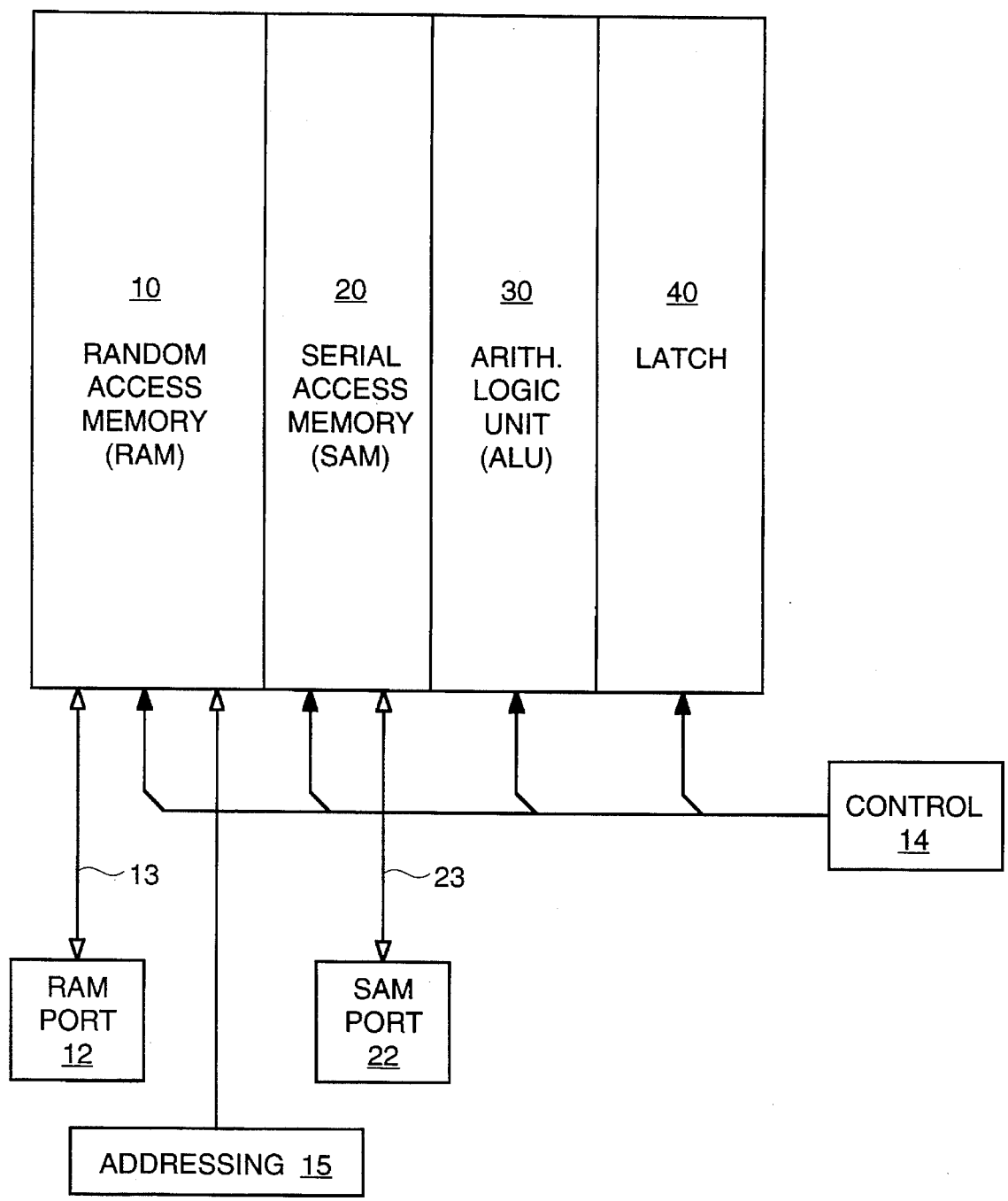
FIG. 1 is a block diagram of a first embodiment, showing RAM, SAM, an ALU, and a latch.

As shown in FIG. 1, a first embodiment of the invention includes a 512 row by 2048 column array of RAM 10, a 2048 bit wide SAM register 20, a 2048 bit ALU 30, and a 2048 bit latch 40. These units are connected in such a way that corresponding bits of a selected row in RAM 10, the SAM register 20, the ALU 30, and the latch 40 define a bit slice 50 of a total 2048 bit wide multiprocessor.

Figure 2:
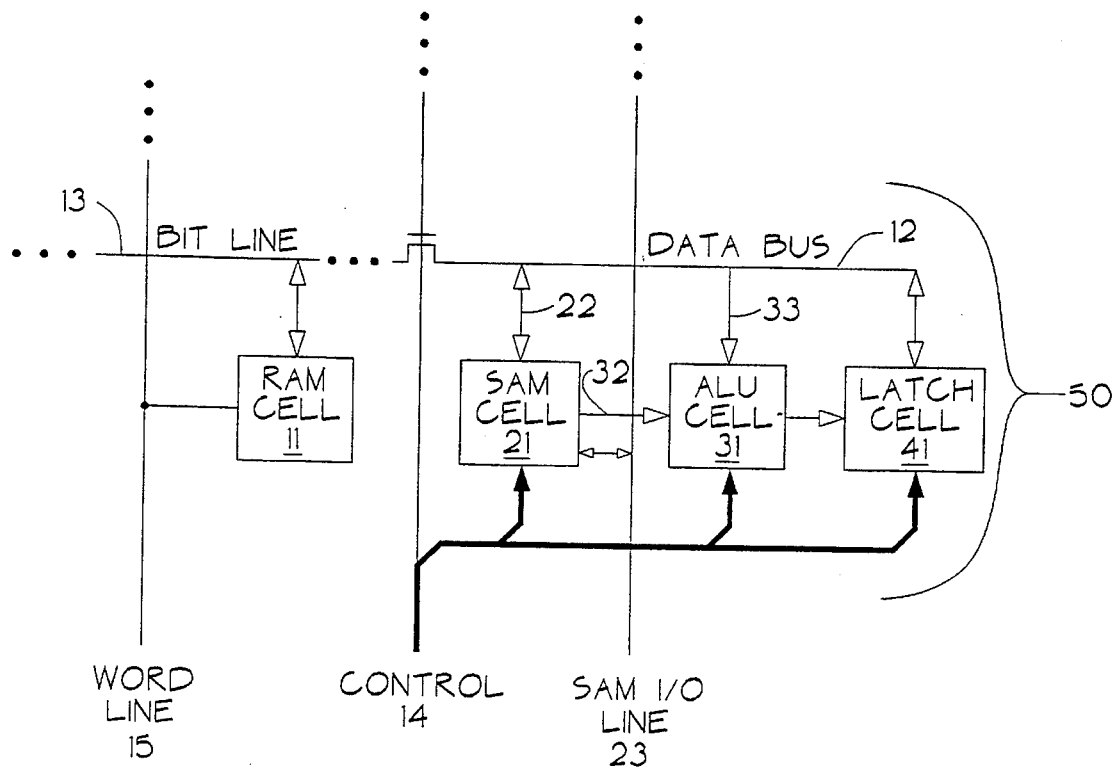
FIG. 2 shows one slice of the first embodiment, detailing cells in the RAM, SAM, ALU, and latch, and connections between them.

One slice 50 of the embodiment is detailed in FIG. 2. In one of 2048 ALU cells 31, a first input 32 is taken from a corresponding one of 2048 SAM cells 21. A second ALU cell input 33 is taken from a corresponding one of 2048 data buses 12. The ALU cell 31 outputs to a corresponding one of 2048 latch cells 41. The SAM cell 21, the latch cell 41, and a RAM cell 11 in a corresponding one of 2048 columns 13 all communicate bidirectionally on the data bus 12. For each slice 50, only one cell 11, 21, 31, or 41 drives the data bus 12 at a time. Although only one line is shown for data bus 12, a plurality of data wires can be used for one bus 12, such as one wire for data, and one wire for its inverse. Control signals 14 control the action of each cell 11, 21, 31, and 41. Included in the control signals 14 is SAM 20 decoding.

The SAM register 20 behaves like a latch, having bidirectional parallel access to the data buses 12, and having bidirectional serial access to the outside world. Although the SAM register 20 could be, and acts like, a shift register, a pointer latch technique is used, where each cell 21 in the SAM register 20 is decodably accessed. A counter (not shown) generates this address, so that as the counter increments or decrements, each SAM register cell 21 is serially accessed, giving the illusion that bits are being shifted in or out. This is in contrast to shift register practice, where bits are indeed shifted from cell to cell. In this application, both techniques render data serially accessible and are equally usable.

A selective clear (also called a masked clear) operation, such as might be used to clear carry bits C, is shown in FIG. 3. Data to be masked is loaded into a RAM 10 row RAM1. This can be done by standard RAM access techniques, or the data can be serially loaded into the SAM register 20 and then wholly transferred into the RAM 10 row RAM1. The mask is then loaded into the SAM register 20. This can be done by serially loading the mask into SAM 20, or by wholly transferring the contents of a RAM 10 row into SAM 20. The ALU 30 then performs an AND operation, using the selected RAM 10 row RAM1 and the SAM register 20 as inputs, and placing the output into the latch 40. The result, with selected bits now cleared and the rest unaltered, is then wholly transferrable into RAM 10 or SAM 20, for access, storage, or further processing. Similar simple logic such as OR, XOR, NAND, NOR, XNOR, Set, and Clear can be performed just as easily.

Figure 4:
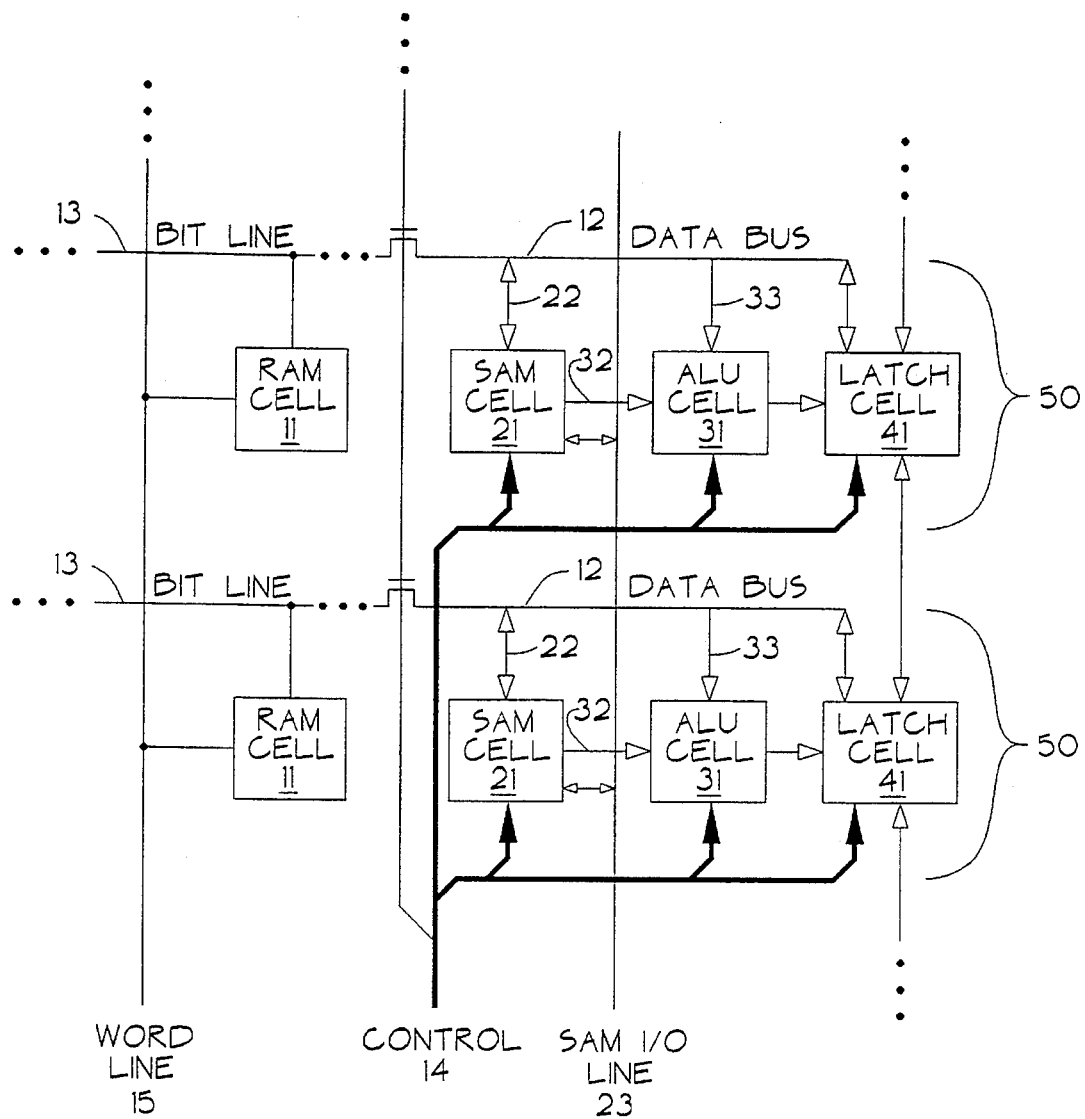
FIG. 4 shows two slices of a second embodiment, detailing cells in the RAM, SAM, ALU, and latch, and connections between them.

A second embodiment, detailed in FIG. 4, includes all of the first, with the exception that the latch 40 is a shift register. Using this shift register 40 with a simple logic ALU 30 as described above, the second embodiment performs parallel addition as well as simple logic. Such an addition is detailed in FIG. 5, which follows the description below.

In the example, two nibble adds are performed simultaneously. In the actual device, the number of columns divided by n+1 for a word width n gives the number of words that can be added in parallel (n+1 allows space for a carry bit for each word). For example, this embodiment (2048 columns, 13) can add 409 nibbles or 227 bytes in parallel.

The ALU 30 in the second embodiment does simple logic, so addition is done in steps. For an n-bit word addition, n addition cycles are required to process the resulting carry bits.

Figure 5:
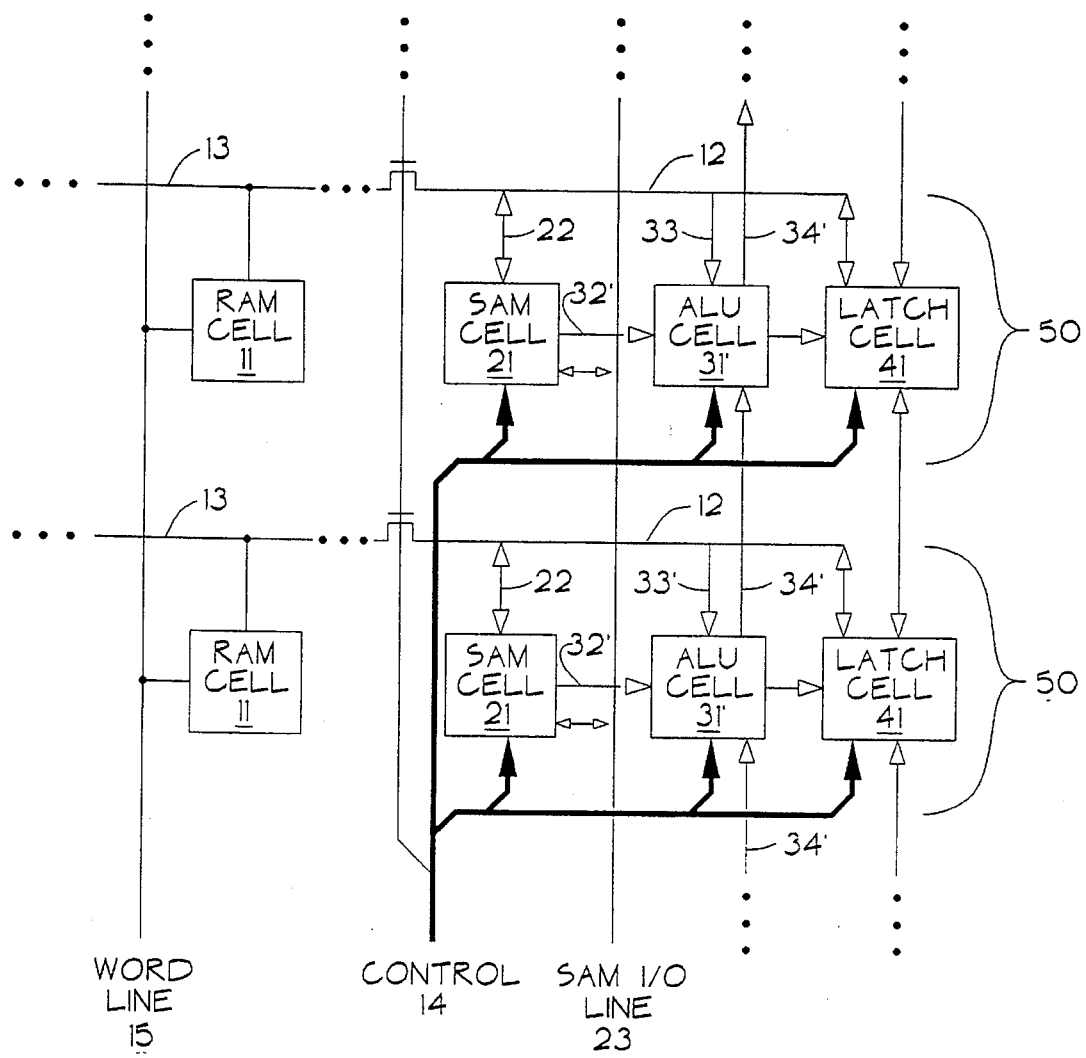
FIG. 5 shows two slices of a third embodiment, detailing cells in the RAM, SAM, ripple carry adding ALU, and latch, and connections between them.

As shown in FIGS. 1, 4 and 5, each nibble has four bits, arranged from least significant to most significant. Associated with each nibble is one carry bit C.

An addition operation for 1010+0110 and 1110+1101 using the second embodiment is now described. RAM1 and RAM2 are first and second rows 15 in RAM 10, and SAM is the SAM register. The addition operation shown adds RAM1 and RAM2 and places the result in RAM2. A row RAM3 is used as a "scratchpad" row.

First, the apparatus is initialized by the user. This consists of loading words to be added, clearing the carry bits C (using a masked clear), and transferring a word set to SAM 20. In this example the words are arranged as first and second nibble sets, each nibble set including first and second nibbles. The first nibble set is loaded into RAM1 and the second nibble set is loaded into RAM2. This loading can be done by random accessing RAM 10 itself, or by serially loading a nibble set into SAM 20, then wholly transferring the set from SAM 20 to a row 15 in RAM 10.

The masked clear is done as previously described, by serially loading mask bits into SAM 20, then using the ALU 30 to AND SAM 20 with RAM1 and RAM2. In this way the carry bits C are masked to zero, while the original data bits are retained. RAM1 is then transferred to SAM 20 in preparation for addition cycles. Clearing the carry bits C can also be done by other means previous to loading the data into the apparatus. If this second approach is used, the above described masking steps done by the apparatus can be skipped.

The first add cycle is now described. RAM2 is XORed with SAM 20 (which contains the nibble set from RAM1), the result (Sum) going to the latch 40. The latch 40 contents are then transferred to "scratchpad" row RAM3. Then RAM2 is ANDed with SAM 20 (which still contains the RAM1 nibble set), the result (Carry) going to the latch 40. The latch 40 contents are then shifted up one column (to move the carry bits up for the next add cycle) and transferred to SAM 20.

This cycle is repeated, alternating the use of RAM2 and RAM3 with each cycle, as shown in FIG. 5.

The last (in this case, fourth) cycle need not find and shift carry bits C, as the carry bits C are fully worked out by this cycle. The addition operation answer is in RAM2.

The second embodiment also multiplies and divides by powers of two by shifting data in the latch 40. Shifting data left one bit has the same effect as multiplying by two. Conversely, shifting data right one bit has the same effect as dividing by two.

A third embodiment of the invention, detailed in FIG. 5, includes all of the second as described above, and also includes a full function ALU 30' that performs ripple carry addition, indicated by carry signals 34'. In this embodiment, no addition cycles are necessary because of the ripple carry addition ability of the ALU 30'. FIG. 7 shows the parallel addition of 1010+0110 and 1110+1101 using the third embodiment. In view of the foregoing discussion of the operation of the second embodiment, FIG. 7 is self explanatory.

Figure 8:
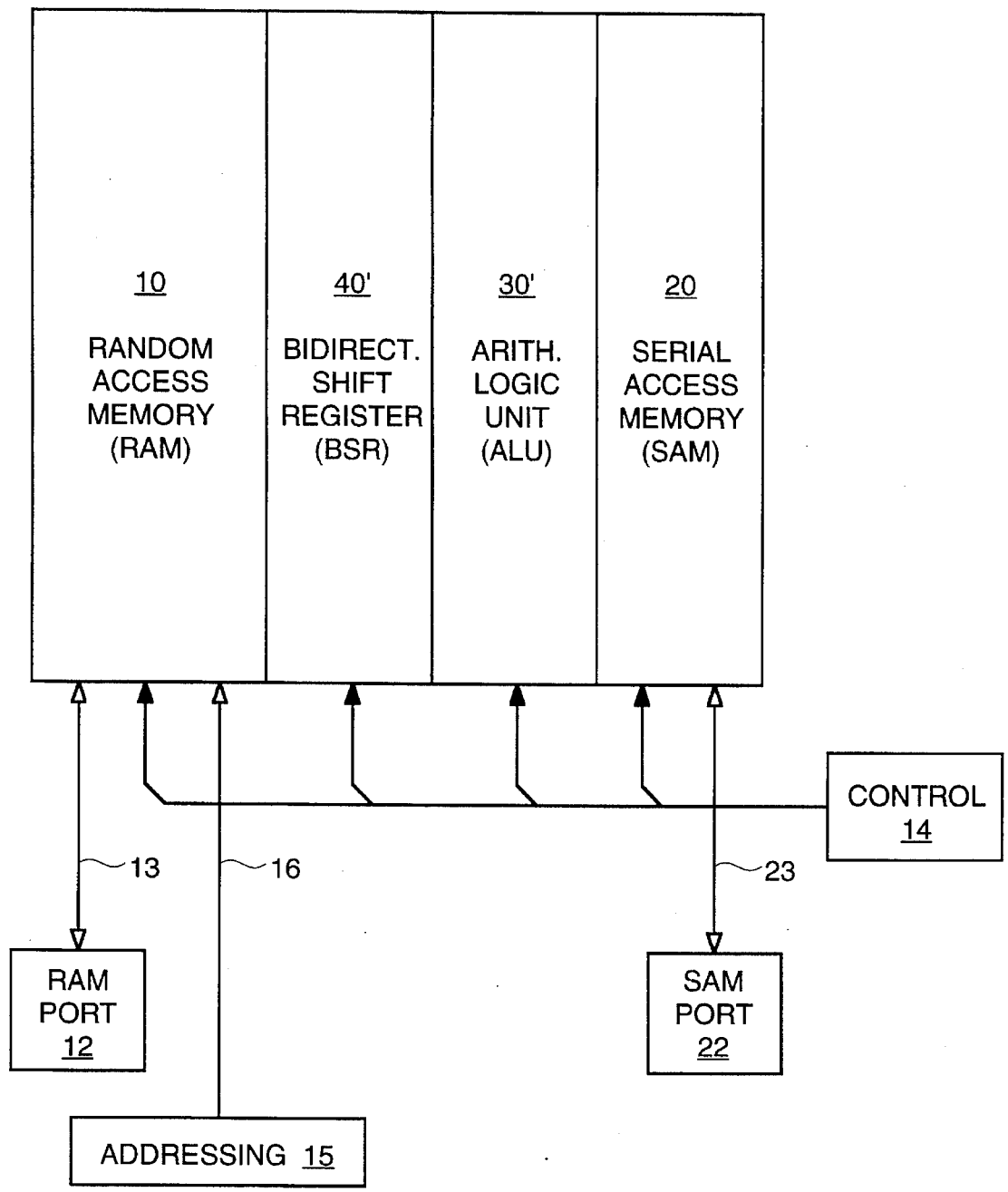
FIG. 8 is a block diagram of a fourth and fifth embodiment, showing RAM, SAM, an ALU, and a bidirectional shift register (BSR).
Figure 9:
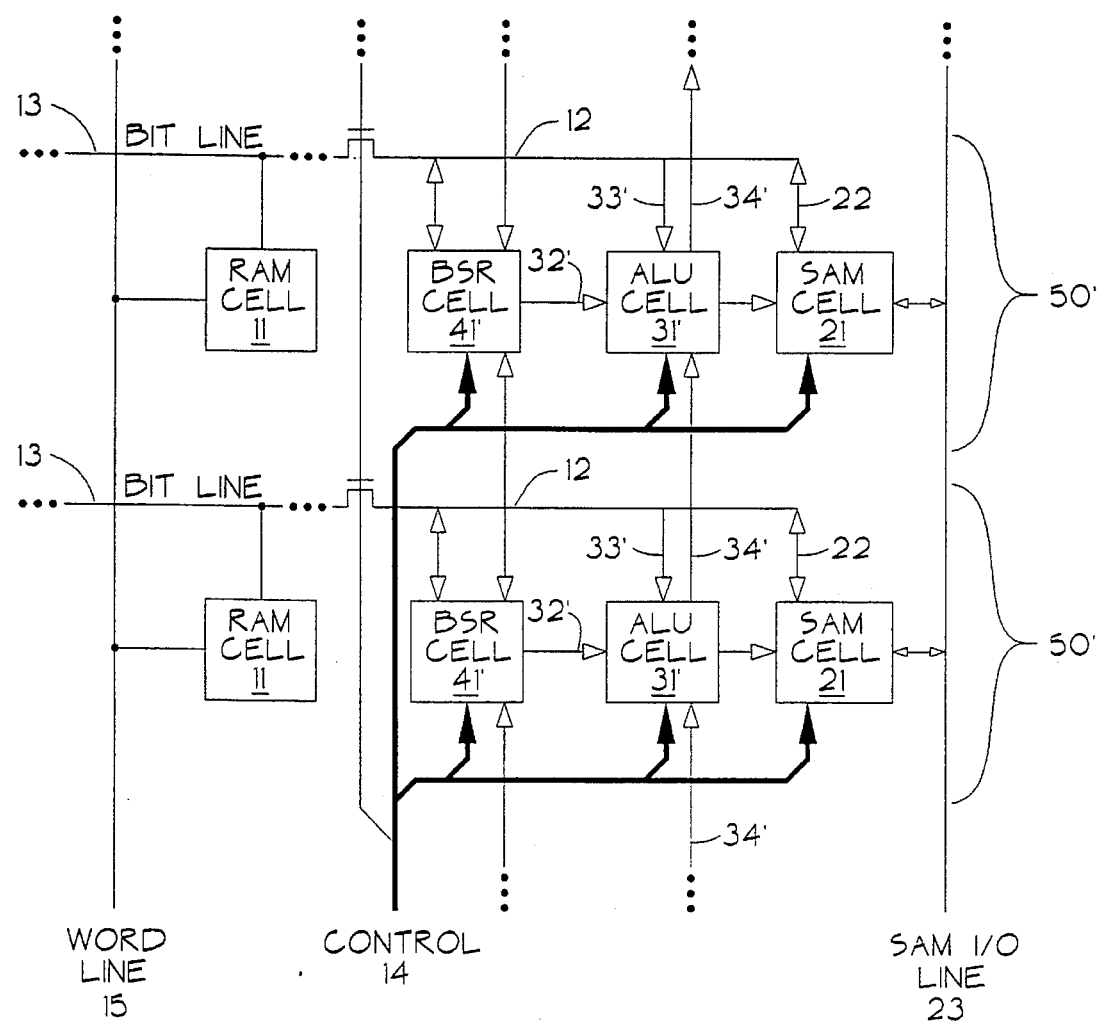
FIG. 9 shows two slices of the fourth embodiment, detailing cells in the RAM, SAM, ALU, and BSR, and connections between them.

A fourth embodiment, shown in FIGS. 8 and 9, includes a 512 row by 2048 column array of RAM 10, a 2048 bit wide SAM register 20, a 2048 bit ALU 30', and a 2048 bit bidirectional shift register (BSR) 40'. These units are connected in such a way that corresponding bits of a selected row 15, the SAM register 20, the ALU 30', and the BSR 40' define a bit slice 50' of a total 2048 bit wide multiprocessor.

Two slices 50' of the embodiment are detailed in FIG. 9. In one of 2048 ALU cells 31', a first input 32' is taken from a corresponding one of 2048 BSR cells 41'. A second ALU cell input 33' is taken from a corresponding one of 2048 data buses 12. The ALU cell 31' outputs to a corresponding one of 2048 SAM cells 21. In a given slice 50', the SAM cell 21, the BSR cell 41', and a RAM cell 11 in a corresponding one of 2048 columns 13 all communicate bidirectionally on the data bus 12. For each slice 50', only one cell 11, 41', or 21 drives the data bus 12 at a time. Control signals 14 control the action of each cell 11, 41', and 21, as well as decode SAM 20.

Now disclosed is a multiplication method, using nibbles for an example, said method being highly suited for use with the fourth embodiment.

Binary multiplication follows the same form as decimal multiplication. Intermediate products are obtained by multiplying Y by each bit in Z, as shown in FIG. 10a, the least significant bit (lsb) of each intermediate product being placed in the same column as the Z bit used to form the intermediate product. The intermediate products are then summed, the sum being the final product.

Binary multiplication offers a unique advantage, in that the intermediate products will either be zero (if the Z bit used is a zero), or Y times a power of two (if the Z bit used is a one). For the example, suppose registers S and R are provided, S being shiftable. Y is loaded into S, and R is cleared. Also suppose that means for addition is provided that can operate on inputs S and R, outputting to R, and that all steps are ordered by controlling means able to make decisions according to bit values in Z. Accept that Z00 denotes the lsb of Z, Z03 denotes the most significant bit (msb) of Z, and Z01 and Z02 denotes the bits between, all the bits of Z being ordered consecutively. The algorithm in FIG. 10b can now be performed, the result residing in R. If Z0n is 1, R obtains the sum of S and R, and S is shifted left one column for use in a subsequent subZ cycle. If Z0n is 0, no sum is performed, and S is still shifted left one column for a subsequent subZ cycle. Note that for a final subZ cycle there are no more subsequent subZ cycles, so the S shift is unnecessary, but still shown in FIG. 10b for consistency. Also note that the number of subZ cycles required is the same as the number of bits in Z.

A matrix multiplication example using a parallel application of this method within the fourth embodiment is shown in FIG. 11, referencing FIG. 8, where a 2×2 nibble matrix Y is multiplied by a 2×1 nibble matrix Z, the result being a 2×1 matrix X. After initializing, the multiplication includes one Z cycle per matrix row, each Z cycle including at least one subZ cycle. The number of subZ cycles is determined by the word width in matrix Z (in this case four, because Z is a nibble matrix).

Matrix Y in this example includes two columns of data (matrix columns A and B), and two rows (matrix rows 1 and 2). The elements of matrix Y are therefore named A1, A2, B1, B2, as shown in FIG. 11. Similarly shown, matrix Z contains elements Z1 and Z2, and matrix X contains X1 and X2, where $$X1 = A1Z1 + B1Z2$$

and $$X2 = A2Z1 + B2Z2.$$

It should be noted that each element of matrix column A is multiplied by element Z1, and each element of matrix column B is multiplied by element Z2. This is advantageously accomplished in the fourth embodiment by multiplication in parallel of column A with Z1, and column B with Z2, the subproduct columns being accumulatively summed in parallel. It should also be noted that where A1, A2, B1, B2, Z1, and Z2 are all nibbles, X1 and X2 each will contain up to nine bits, necessitating the need for 'padding' five zeros (shown as dummy bits D) to the msb end of each nibble, to make room for the final product.

Comparing the matrix example of FIG. 11 to the scalar example of FIGS. 10a and 10b, a RAM 10 row RAM3 is used instead of register R, and the BSR 40' is used instead of shift register S. Addition means is accomplished by the ALU 30'. Matrix columns A and B are stored in memory rows RAM1 and RAM2, respectively. The elements of matrix Z are used by controlling means (not shown) to operate the embodiment, similar to the example of FIGS. 10a and 10b. For efficiency, the final subZ cycle of each Z cycle does not contain a shift step.

Memory row RAM3 contains a running sum during the whole multiplication, holding the final product when the multiplication is done.

Although a 2×2 nibble matrix is shown in the example, this particular embodiment can multiply much larger user-configured matrices.

Figure 12:
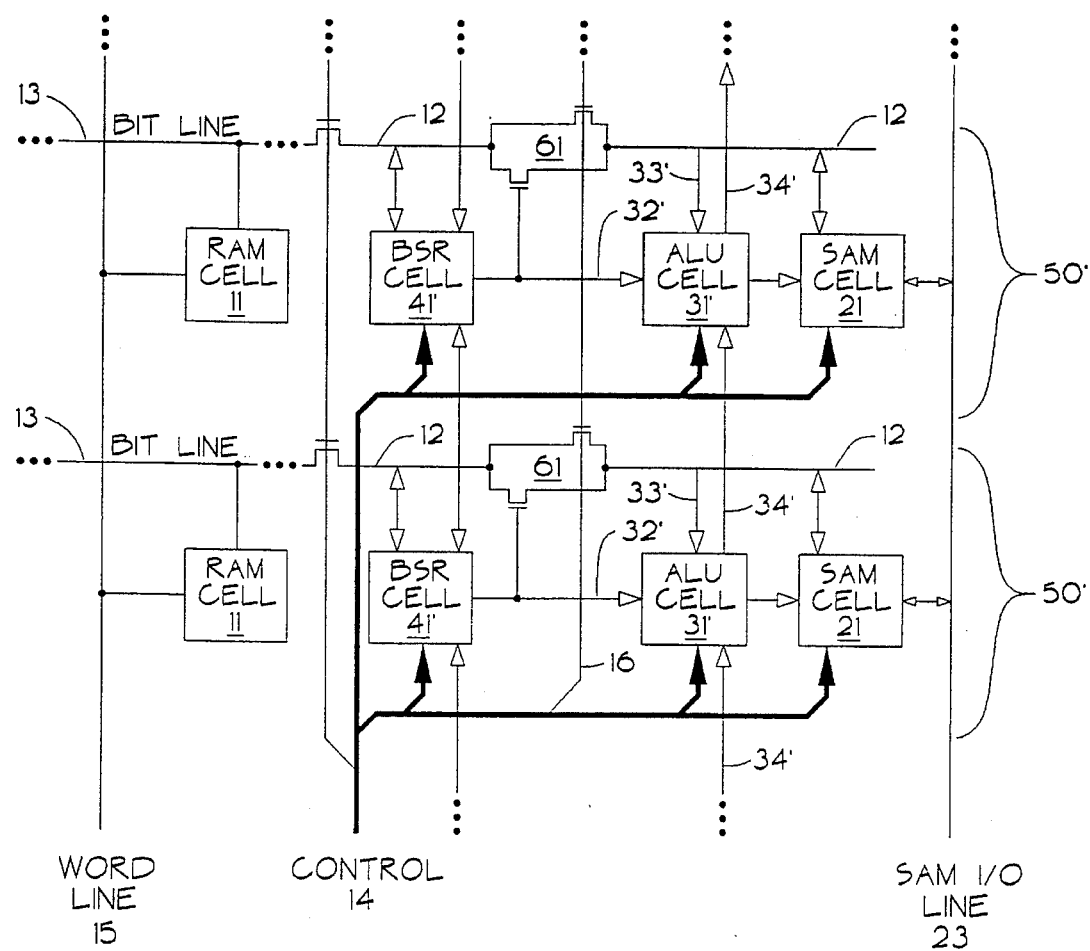
FIG. 12 shows two slices of a fifth embodiment, detailing mask circuitry.

A fifth embodiment, two slices 50' of which are shown in FIG. 12, includes all of the fourth, and also includes mask circuitry 61 on the output of each BSR cell 41'. A control signal 16 disables and enables mask circuitry 61. In this case (using n-channel field effect transistors), a zero on control 16 enables mask circuitry 61, and a one disables. When the mask circuitry 61 is enabled, a zero in BSR cell 41' enables the mask for that bit, not allowing data on the data bus 12 to cross the masking circuitry 61. A one in BSR cell 41' disables the mask for that bit, allowing data on the data bus 12 to cross the masking circuitry 61. An example is shown in the table of FIG. 13. Data bits A reside in RAM 10 row RAM1, and data bits B reside in SAM 20. RAM1 is transferred to SAM 20 with some bits masked (ALU 30' is disabled), bits to be masked determined by zeros in the BSR 40'. Because the mask bits are located in the BSR 40', the mask can be easily shifted. This feature is highly useful for windowing in video applications, giving the ability for hardware based movement of superimposed windows in a video field without tampering with the window contents.

Figure 14:
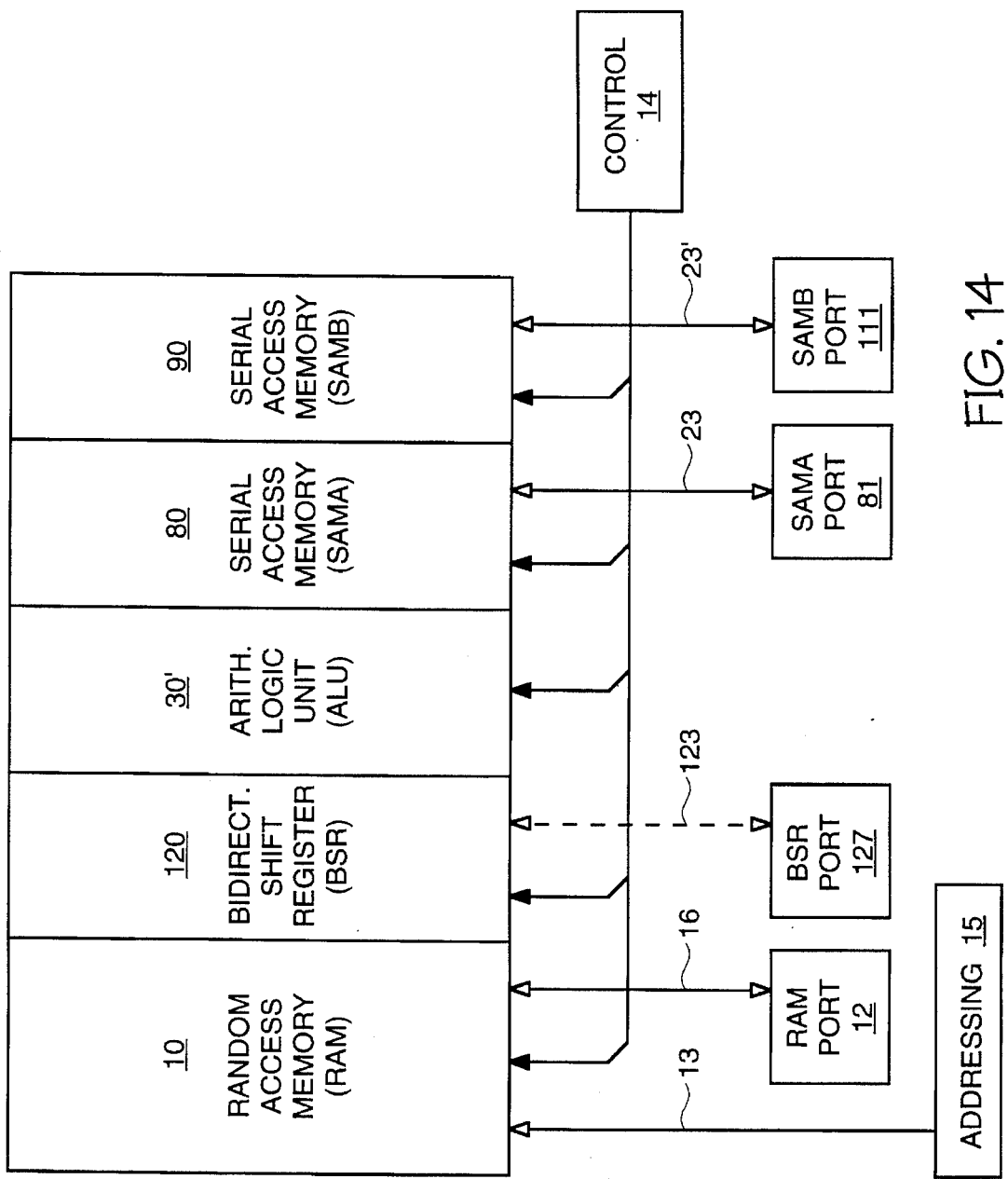
FIG. 14 is a block diagram of a sixth embodiment, showing RAM, two SAMs, an ALU, and a BSR.
Figure 15:
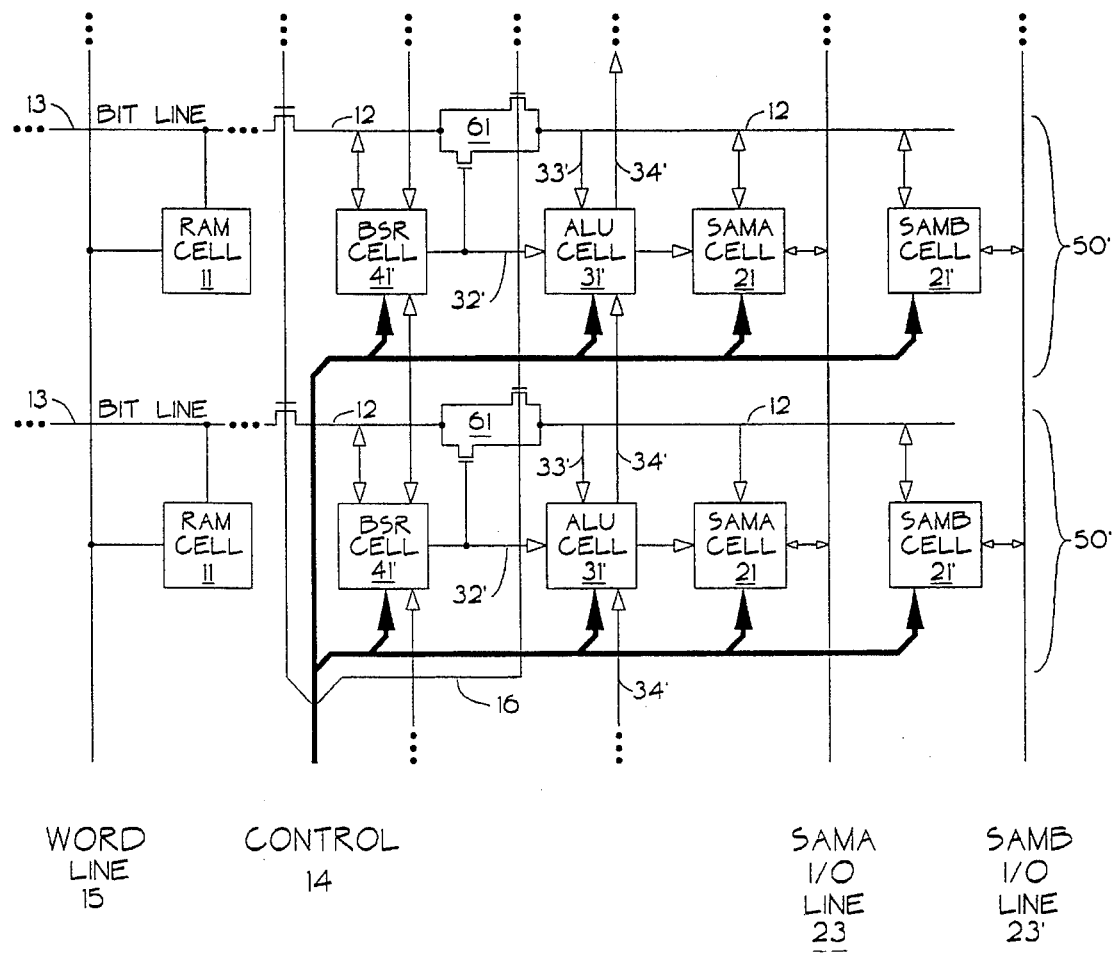
FIG. 15 shows two slices of a sixth embodiment.

A sixth embodiment shown in FIGS. 14 and 15 includes a first SAM register SAMA 80, a second SAM register SAMB 90', RAM 10, an ALU 30', and a BSR 120'. RAM 10, SAMA 80, and SAMB 90' each have their own port. A BSR 120' port (shown in dotted lines) is optional. The sixth embodiment operates like the fifth, with the two SAMs 80 and 90' offering a more flexible architecture.

Clearly, many variations can be made to these embodiments while remaining within the scope of the invention. An ALU including functions not described here may be included. Any number of SAM registers, ALUs, and latches might be used, with any communication arrangement between them. Additionally, one or more of the elements described may or may not be ported to the outside world. A 1M×1 bit RAM configuration is disclosed, but other configurations can be used, such as 128 k×8, where each RAM row, SAM, ALU, and latch (or BSR) are 8 bits wide instead of 1. RAM may include static or dynamic RAM or both. Data blocks may be defined as columns instead of rows, or row and column operations may be performed as opposed to simply row operations.

We claim:

1. An integrated circuit, comprising:
   a) random access memory having at least a first portion of memory cells for storing data, said first portion of memory cells arranged to have a width;
   b) a serial access memory for storing data, said serial access memory having a width equal to said width of said first portion of memory cells;
   c) a memory store for storing data, a width of said memory store equal to said width of said first portion of memory cells;
   d) an arithmetic logic unit for performing at least one of a logic function and an arithmetic function, said arithmetic logic unit having a width equal to said width of said first portion of memory cells, said arithmetic logic unit serially electrically interposed between said serial access memory and said memory store, said arithmetic logic unit receiving an input signal from at least one of said serial access memory and said memory store and outputting an output signal to a remaining one of said serial access memory and said memory store;
   e) a data transfer node for accepting data in parallel from said serial access memory and from said memory store and for providing data in parallel to said serial access memory and to said memory store and to said arithmetic logic unit; and
   f) a coupling means for coupling said data transfer node to said dynamic random access memory, said coupling means capable of transferring data bidirectionally between said dynamic random access memory and said data transfer node without accessing data through an external port.

2. The integrated circuit as specified in claim 2, wherein said memory store is a latch circuit.

3. The integrated circuit as specified in claim 2, wherein the output signal of said arithmetic logic unit is latched in said memory store.

4. The integrated circuit as specified in claim 1, wherein said memory store is a shift register.

5. The integrated circuit as specified in claim 4, wherein said shift register provides the input signal to said arithmetic logic unit.

6. The integrated circuit as specified in claim 1, wherein said arithmetic logic unit performs one of said logic function and said arithmetic function on data received from said transfer node and on the input signal received from one of said serial access memory and said memory store.

7. The integrated circuit as specified in claim 1, further comprising a masking means having a width equal to said width of said first portion of memory cells, said masking means masking a data transfer between said dynamic random access memory and at least one of said arithmetic logic unit, said serial access memory, and said memory store.

8. The integrated circuit as specified in claim 6, wherein said masking means is responsive to an output signal of one of said memory store and said serial access memory.

9. An integrated circuit, comprising:
   a) a dynamic random access memory having at least one portion having a width;
   b) a plurality of data stores comprising an arithmetic logic unit, said data stores having widths equal to said width of said at least one portion; and
   c) a transfer means for transferring data bidirectionally in parallel between at least two of said data stores of said plurality of data stores and said dynamic random access memory, without accessing data through an external port.

10. A computer system, comprising:
   a) random access memory having at least a first portion of memory cells for storing data, said first portion of memory cells arranged to have a width;
   b) a serial access memory for storing data, said serial access memory having a width equal to said width of said first portion of memory cells;
   c) a memory store for storing data, a width of said memory store equal to said width of said first portion of memory cells;
   d) an arithmetic logic unit for performing at least one of a logic function and an arithmetic function, said arithmetic logic unit having a width equal to said width of said first portion of memory cells, said arithmetic logic unit serially electrically interposed between said serial access memory and said memory store, said arithmetic logic unit receiving an input signal from at least one of said serial access memory and said memory store and outputting an output signal to a remaining one of said serial access memory and said memory store;

e) a data transfer node for accepting data in parallel from said serial access memory and from said memory store and for providing data in parallel to said serial access memory and to said memory store and to said arithmetic logic unit; and f) a coupling means for coupling said data transfer node to said dynamic random access memory, said coupling means capable of transferring data bidirectionally between said dynamic random access memory and said data transfer node without accessing data through an external port.

11. A computer system, comprising:

a) a dynamic random access memory having at least one portion having a width;

b) a plurality of data stores comprising an arithmetic logic unit, said data stores having widths equal to said width of said at least one portion; and c) a transfer means for transferring data bidirectionally in parallel between at least two of said data stores of said plurality of data stores and said dynamic random access memory, without accessing data through an external port.

* * * * *